United States Patent [19]

McCreery

[11] 4,035,889
[45] July 19, 1977

[54] CUT OFF TOOL

[75] Inventor: James F. McCreery, Latrobe, Pa.

[73] Assignee: Kennametal Inc., Latrobe, Pa.

[21] Appl. No.: 686,510

[22] Filed: May 14, 1976

[51] Int. Cl.² .............................................. B26D 1/12
[52] U.S. Cl. ...................................................... 29/96
[58] Field of Search ........................................... 29/96

[56] References Cited

U.S. PATENT DOCUMENTS

| 1,542,007 | 6/1925 | Schroder | 29/96 |
| 2,416,975 | 3/1947 | Anthony | 29/96 |
| 2,419,081 | 4/1947 | Messenger | 29/96 |
| 2,836,240 | 5/1958 | Nuding | 29/96 |
| 3,172,191 | 3/1965 | Schoffel et al. | 29/96 |
| 3,238,607 | 3/1966 | Wallbom | 29/96 |
| 3,455,001 | 7/1969 | Sirola | 29/96 |
| 3,775,817 | 12/1973 | Hertel | 29/96 |

FOREIGN PATENT DOCUMENTS

| 645,223 | 7/1964 | Belgium | 29/96 |
| 507,540 | 6/1939 | United Kingdom | 29/96 |

*Primary Examiner*—Harrison L. Hinson
*Attorney, Agent, or Firm*—Lawrence R. Burns

[57] ABSTRACT

A grooving and cut off tool is disclosed having a structure in which a relatively thin tool support blade has mounted thereon a replaceable cutting means and the tool support blade is reinforced by engagement with a reinforcing block so that the relatively thin tool support blade will not buckle when subjected to extremely rapid grooving and cut off operations.

6 Claims, 5 Drawing Figures

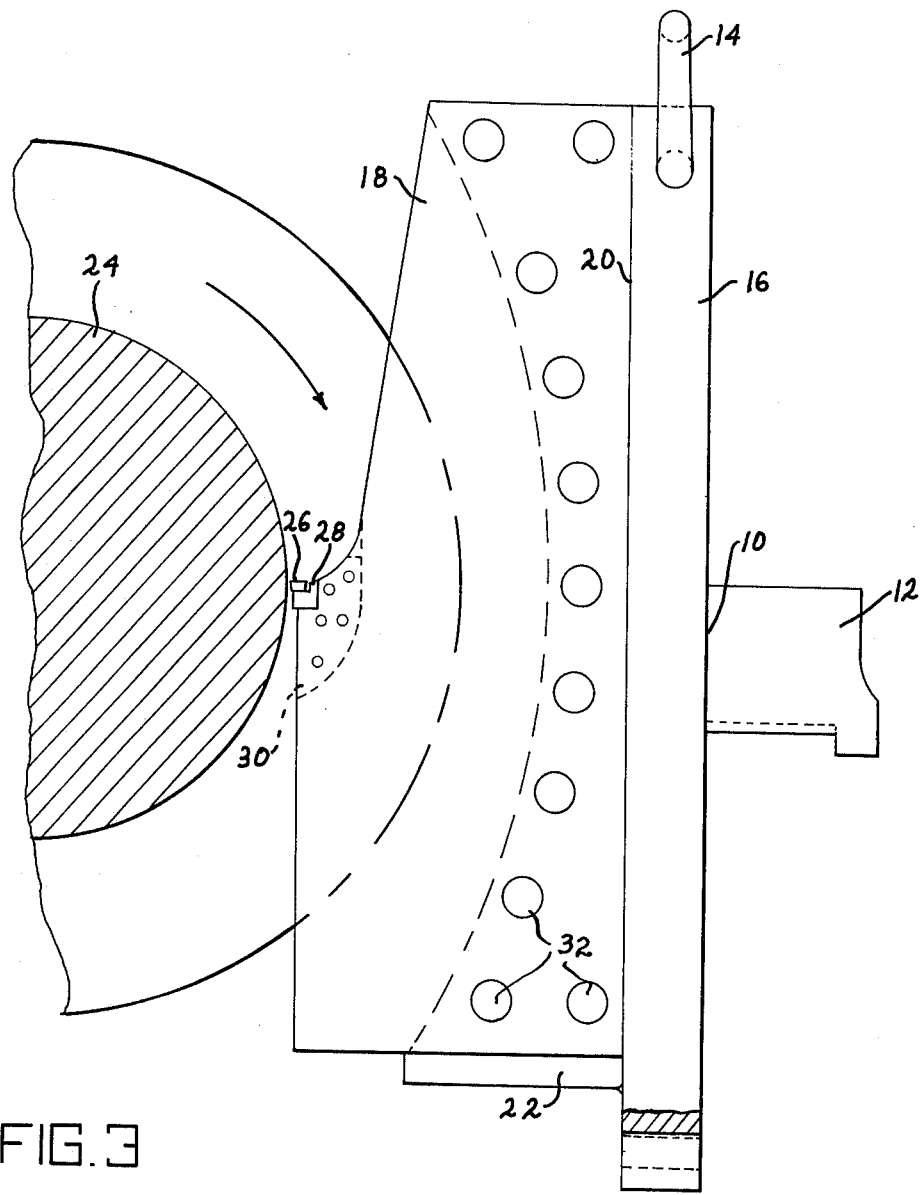

CUT OFF TOOL

BACKGROUND OF THE INVENTION

Many grooving and cut off tool structures are known in the art and the structures vary widely, depending upon whether grooving is the primary operation of the tool or a cut off operation is the primary operation of the tool.

When such structures are involved in a cut off operation, the structures must compensate for two competing efficiency factors that are seemingly opposed to one another. First, in a cut off tool, it is desirable to make the cut as thin as possible in order not to waste the material which is being severed. The waste of such material can be quite large in certain manufacturing operations where extremely long bars of material are cup up into discrete shorter segments.

Competing with the idea that waste is to be minimal when such bars are cut up into discrete shorter segments is the idea that in a cut off operation it is most efficient when done as rapidly as possible. In order to achieve a rapid cut off operation, the relative speeds and feeds are increased to a level that substantial forces from the workpiece are exerted upon the blade of the cut off tool.

Since it has been pointed out already above, the cut off tool or blade should be as thin as possible, it is then understandable that there is an upper limit of forces which the relatively thin blade can withstand without buckling and, therefore, the rapidity in which the cut off operation is performed has an upper limit coinciding with the buckling strength of the relatively thin cut off blade.

It is preferable, when providing a structure for a cut off tool, that the structure be able to accept a wide variety of diameters of workpieces which are to be severed.

It is an object of the present invention to provide a relatively thin tool support blade while substantially enhancing its buckling strength.

It is another object of the present invention to provide an easily replaceable cut off tool unit in order to provide a very efficient cut off operation on many large diameter workpieces.

It is a further object of the present invention to provide a cut off tool having a replaceable cutting tip which is firmly mounted on the end of the relatively thin tool support blade.

It is a still further object of the present invention to provide a cut off tool whose rigidity is severely enhanced with the addition of a reinforcing support block while still providing clearance for larger diameter workpieces.

BRIEF SUMMARY OF THE INVENTION

According to the present invention, a removably affixable support structure is provided for mounting on known cutting machines and a tool support blade extends outwardly from the support structure and has a cutting means mounted on its outermost edge from the tool support structure for cutting material from a workpiece.

The overhanging length of the cutting means supported on the tool support blade is structurally reinforced by a support block attaching to the removable support structure and further engaging on one side a large surface area of the extended tool support blade, preferably by an interengaged thread means such as bolts. The reinforcing block is recessed inwardly from its top and bottom ends so as to provide maximum clearance for larger diameter workpieces.

The cutting means on the outermost portion of the tool support blade preferably carries a throw away cutting insert made of a hard wear resistant material and the insert seat itself seats on a removable plate member which is attached to the tool support blade, again, near its outermost point from the support structure. The removable plate member which carries the insert and insert seat may be changed so as to adapt the tool of the present invention for either grooving or cut off operations, whichever is desired.

The exact nature of the present invention will become more apparent upon reference to the following detailed specification taken in connection with the accompanying drawings in which:

FIG. 1 is a side view of the tool of the present invention in engagement with a workpiece.

FIG. 2 is a plan view of the tool of the present invention.

FIG. 3 is a typical insert that may be used in practicing the present invention.

DETAILED DESCRIPTION OF THE INVENTION

Figure 5:
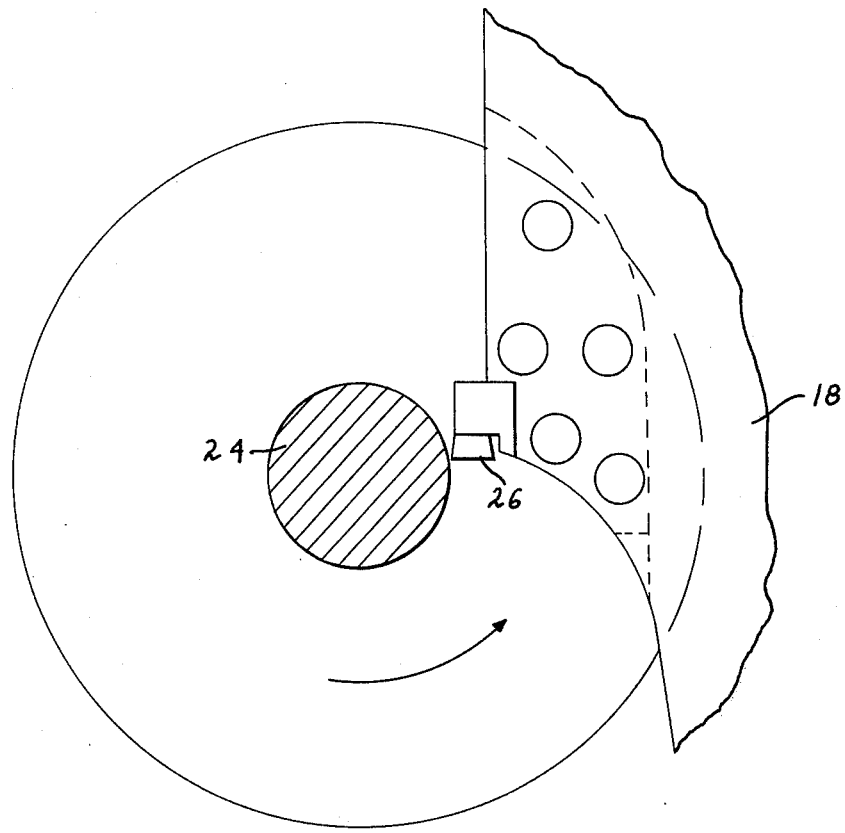
FIG. 5 is a side view of the tool of the present invention engaging a workpiece in a different manner from that shown in FIG. 1.

Referring to the drawings somewhat more in detail, what is shown in FIG. 1 is a removably affixable support structure 10 having an adaptor 12, which is shown by way of example only, in that it is known that adaptors such as pictured can be set into the machine sets of a cutting machine in order to perform cut off operations.

With this in mind, what is shown at the top of FIG. 1 is a carrying handle 14 which may be used in moving the heavy support structure 10 around a shop so as to mount in a machine for operation.

The support structure 10 as shown has a preferably vertical base 16. A tool support blade 18 has a base 20 abutting along the vertical base 16 of support structure 10 and, further, a reinforcing support block 22 has its base also engaged along the vertical base 16 of support structure 10. Tool support blade 18 extends outwardly toward the workpiece 24 and has located on its outermost point a cutting insert 26 which, in turn, is mounted in a cutting insert seat 28 which, in turn, is mounted on a removable plate member 30 which attaches to the tool support blade 18.

The reinforcing support block 22 is engaged on a side face along its vertical length with the side face of tool support member 18, preferably the threaded bolt means. The reinforcing support block 22 is recessed inwardly from both its top and bottom ends with the deepest part of the recess preferably being located at approximately the center of the vertical height of the reinforcing block 22.

With the support block recessed in this manner, the overhanging length of the cutting insert from the vertical base 16 is substantially reinforced due to the fact that the reinforcing support block 22 effectively reduces the overhanging length of the cutting insert 26 since the overhanging length will now be measured from the outermost point of support block 22 to the cutting insert 6.

With the recess of the support block 22, the cut off tool arrangement may now accept a very wide range of workpiece diameters and may also utilize a relatively thin tool support blade.

With reference to FIG. 2, what is shown therein is a plan view showing a relatively thin tool support blade 18 as it extends out over the outermost edges of the reinforcing support block 22. The tool support blade 18 is shown attached by a bolt means 32 to the reinforcing support block 22, both of which abut against a forward looking face of the vertical base section 16. A typical adaptor unit 12 is shown in FIG. 2, and this adaptor unit may vary in design, depending upon the type of machine on which it will be mounted.

In FIG. 2, the outline of the carrying handle 14 is again shown. In even more detail in FIG. 2 is shown the top face of cutting insert 26 and the engagement of the removable plate member 30 with the tool support blade 18. As can be seen in FIG. 2, the cutting insert 26 and the removable plate member 30 need not be greater than the relatively thin cross section of tool support blade 18.

Referring now to FIG. 3, what is shown therein is the cutting insert 26, preferably of a hard wear resistant material, and is typical of the type of cutting inserts which may be used with the tool of the present invention. The insert 26 may be held in its seat by brazing, wedging or other more commonly known means associated with the type of cutting insert as shown in FIG. 3.

Figure 4:
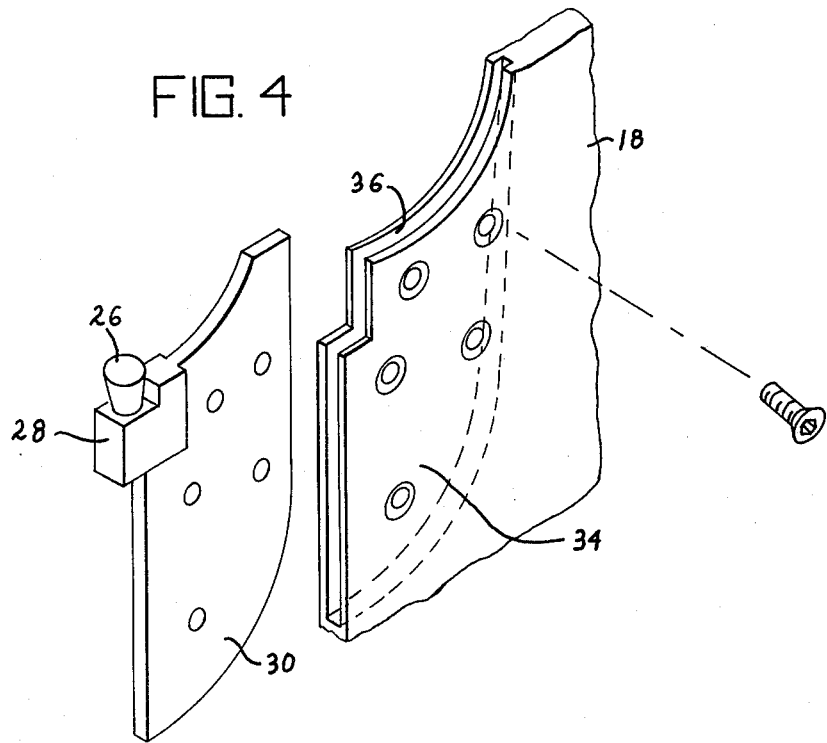
FIG. 4 is a detailed view of the removable plate member used by the present invention.

What is shown in FIg. 4 is the tool support blade 18 and the removable plate member 30 along with insert 26 sitting in a typical insert seat 28. The removable plate member 30 interfits with section 34 of tool support blade 18, a perforation 36 being formed within the relatively thin cross section of tool support blade 18. Removable plate member 30 attaches by commonly known means, such as flat head screws, such that the removable plate member 30 is firmly supported on tool support blade 18.

It is advantageous to have this feature if one wishes to change the type of cutting tools being used without having to interchange either the tool support blade 18 or the entire cutting tool arrangement. Adding further support for the removable plate member 30 is the sloping curved abutment surface 36 formed in tool support blade 18.

Referring now to FIG. 5, the cut off tool of the present invention is shown with the tool support blade 18 vertically reversed from what was shown in FIG. 1 such that the cutting tool 26 may engage the workpiece 24 as the workpiece rotates upwardly into the downwardly facing cutting insert 26. In using the tool of the present invention, it has been found that such extremely rapid metal removal is achieved that the chips actually taken from the workpiece may possibly crowd the cutting insert and have to be forced out of the groove.

When using the cut off tool as illustrated in FIG. 5, the chips being taken from the workpiece by cutting insert 26 are at least aided by gravity in allowing them to fall downwardly out of the groove or slot thereby reducing any crowding effect of the chips upon the cutting insert 26.

Modifications may be made within the scope of the appended claims.

What is claimed is:

1. In a grooving and cut off tool structure; a planar support blade of substantial size having upper and lower ends and front and back edges and side faces and relatively thin in a direction perpendicular to the side faces of the blade, cutting element support means carried by said blade along the front edge for supporting a cutting element, and a rigid support member extending along and fixed to said blade adjacent the back edge thereof, said support member being concave toward said front edge of said blade when viewed in a direction perpendicular to the plane of said blade, said cutting element support means comprises a second member with a blade-like portion, a slot in said front edge of said support blade to receive said blade-like portion of said second member, an angular notch in the front edge of said blade adjacent said slot, and a laterally enlarged portion on said second member seated in said notch and including means for supportingly receiving a cutting element.

2. A grooving and cut off tool according to claim 1 in which said notch comprises a pair of angularly related surfaces positioned to sustain cutting loads imposed on a cutting insert mounted in said enlarged portion.

3. A grooving and cut off tool according to claim 1 which includes a disc-like insert supported by said second member and protruding laterally beyond both side faces of said blade.

4. A grooving and cut off tool according to claim 3 in which said support member has a base formed therein and said insert has a shank extending into said base.

5. A grooving and cut off tool according to claim 1 which includes screw threaded means connecting said support member to said blade.

6. A grooving and cut off tool according to claim 1 in which said blade is longer in the end to end direction than in the direction between said front and back edges, and said cutting element support means being located in about the middle of the length of said front edge.

* * * * *